US006813140B1

(12) United States Patent
Huntington

(10) Patent No.: US 6,813,140 B1
(45) Date of Patent: Nov. 2, 2004

(54) SOLID STATE CAPACITORS AND METHODS OF MANUFACTURING THEM

(75) Inventor: David Huntington, Devon (GB)

(73) Assignee: AVX Limited (GB)

( * ) Notice: Subject to any disclaimer, the term of this patent is extended or adjusted under 35 U.S.C. 154(b) by 0 days.

(21) Appl. No.: 10/130,096

(22) PCT Filed: Nov. 15, 2000

(86) PCT No.: PCT/GB00/04355

§ 371 (c)(1),
(2), (4) Date: Oct. 2, 2002

(87) PCT Pub. No.: WO01/37296

PCT Pub. Date: May 25, 2001

(30) Foreign Application Priority Data

Nov. 15, 1999 (GB) ............................................. 9926975

(51) Int. Cl.[7] .......................... H01G 9/04; H01G 9/145; H01G 2/10
(52) U.S. Cl. ....................... 361/528; 29/25.03; 361/535
(58) Field of Search ............................... 361/523–529, 361/532–541; 29/25.03

(56) References Cited

U.S. PATENT DOCUMENTS 3,588,626 A * 6/1971 Cooper ....................... 361/529
5,198,968 A * 3/1993 Galvagni ..................... 361/529
5,357,399 A   10/1994 Salisbury
6,464,739 B2 * 10/2002 Yoshida et al. ............. 29/25.03

FOREIGN PATENT DOCUMENTS

JP          3-89509      *  4/1991   ............ H01G/9/08
WO          WO0028559       5/2000

* cited by examiner

*Primary Examiner*—Eric Thomas
(74) *Attorney, Agent, or Firm*—Dority & Manning, P.A.

(57) ABSTRACT

The present invention seeks to provide improved solid state capacitors and improved methods of manufacturing such capacitors. According to one aspect of the present invention solid state capacitors are manufactured by providing an electrically conducting substrate and forming a plurality of porous bodies comprising valve action materials on a substrate surface where each body has an upper surface distal to the substrate. An electrically insulating layer is formed over the bodies with a conducting cathode layer being formed over the insulating layer. The substrate is divided into a plurality of capacitor portions where each capacitor portion comprises a body portion and a substrate portion. The end region of each body portion distal from the substrate is provided with a platform that is a cathode terminal site in the final capacitor.

59 Claims, 14 Drawing Sheets

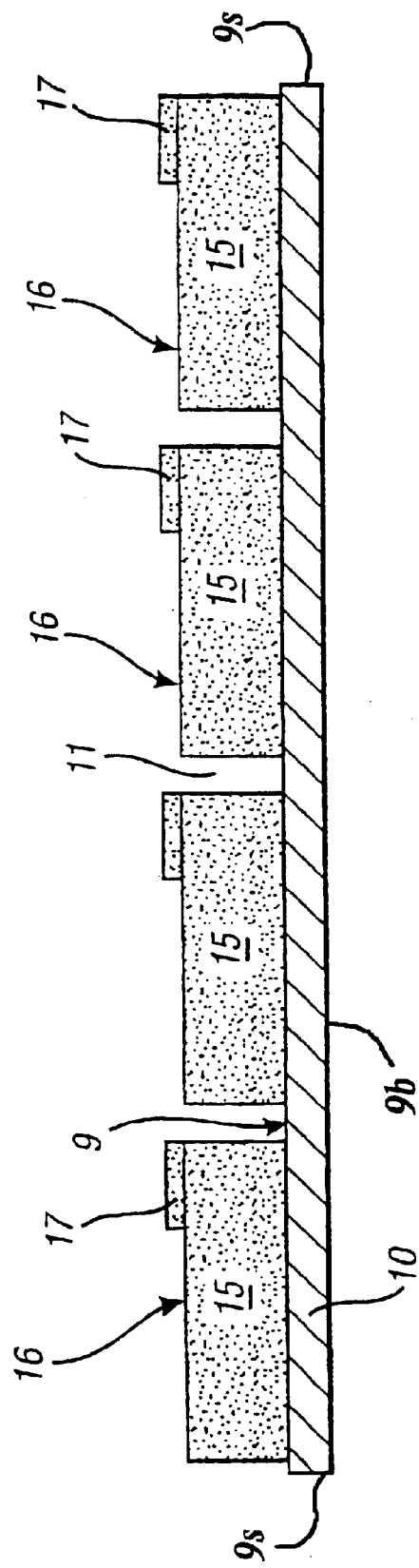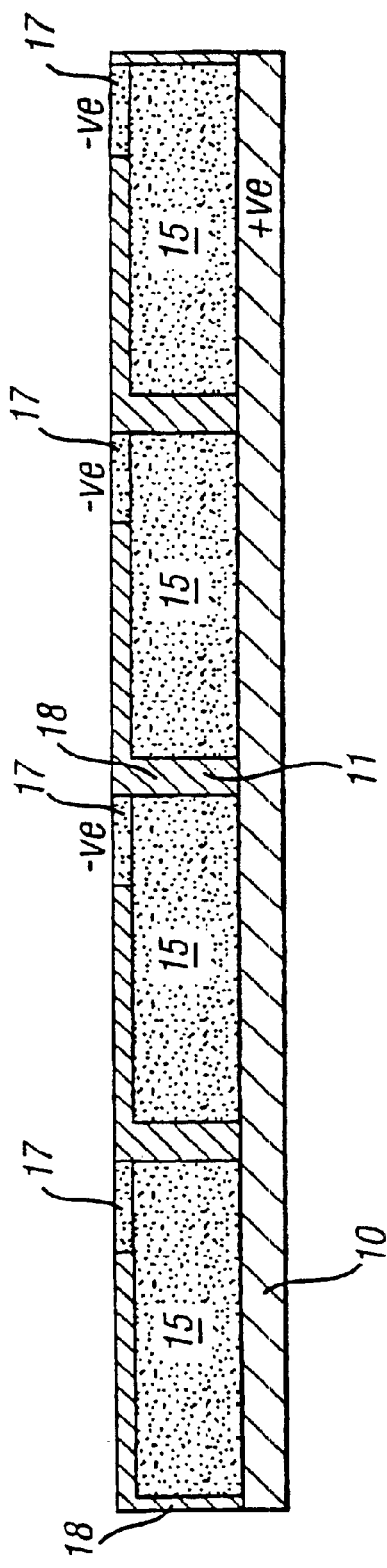

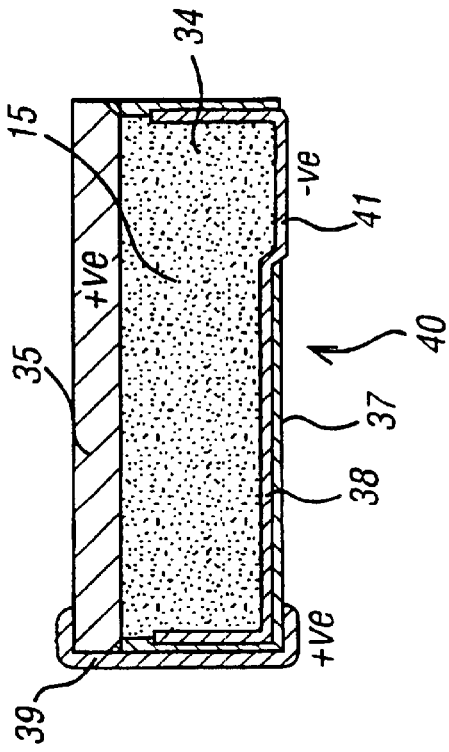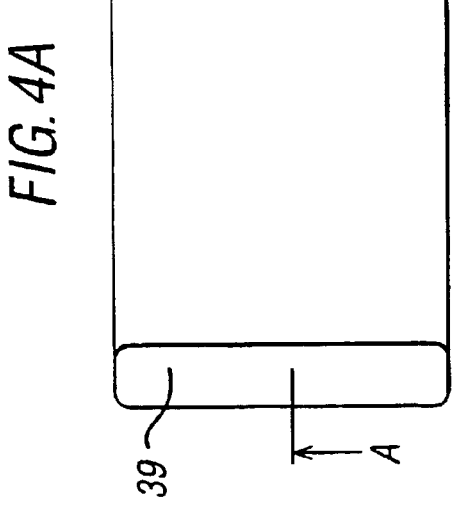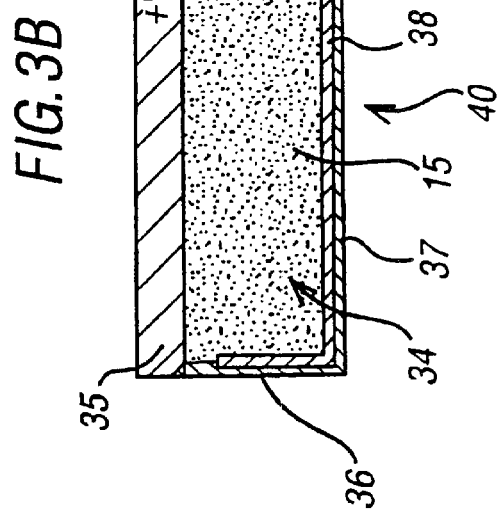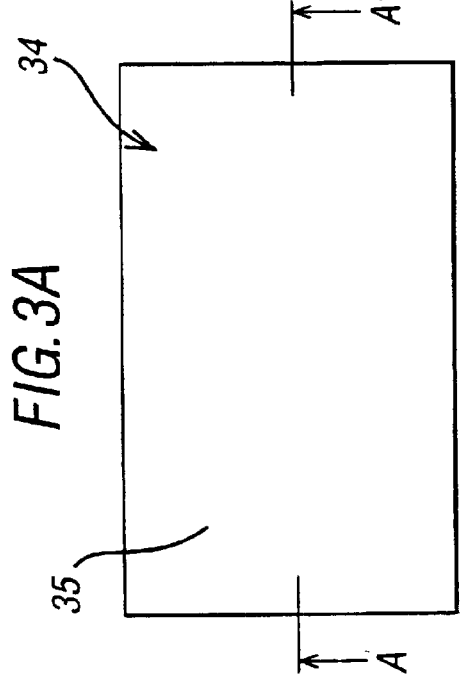

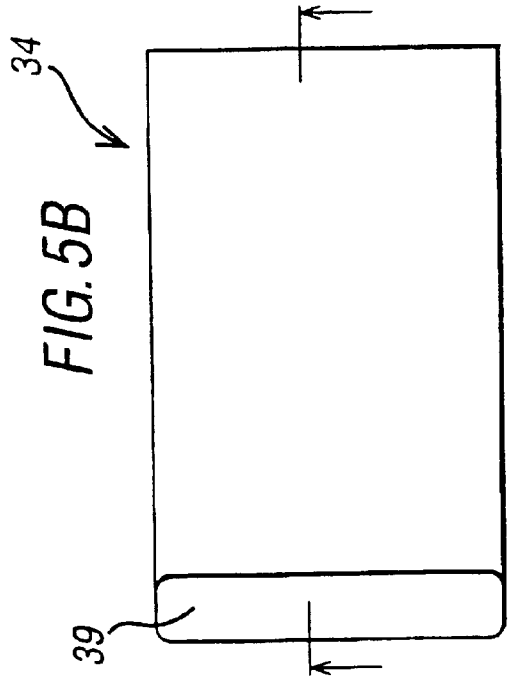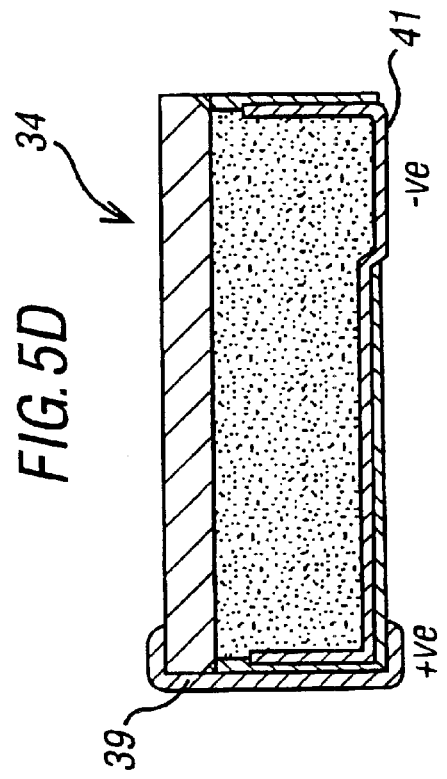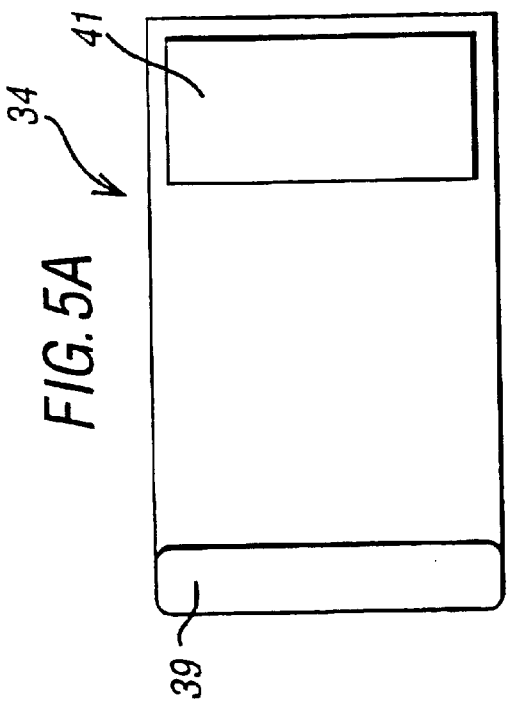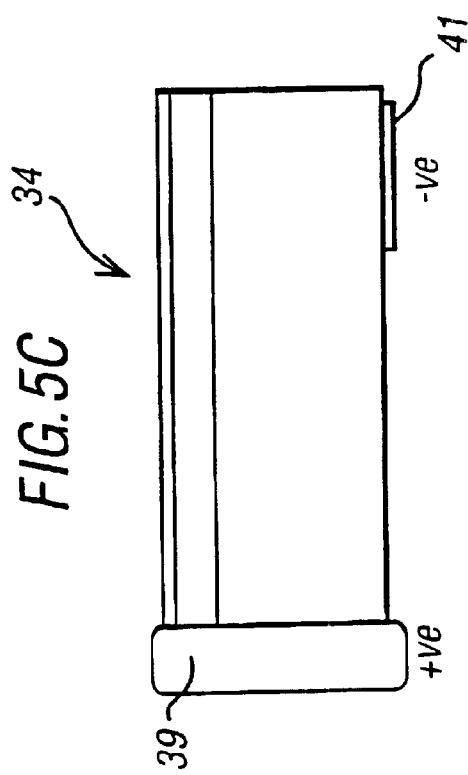

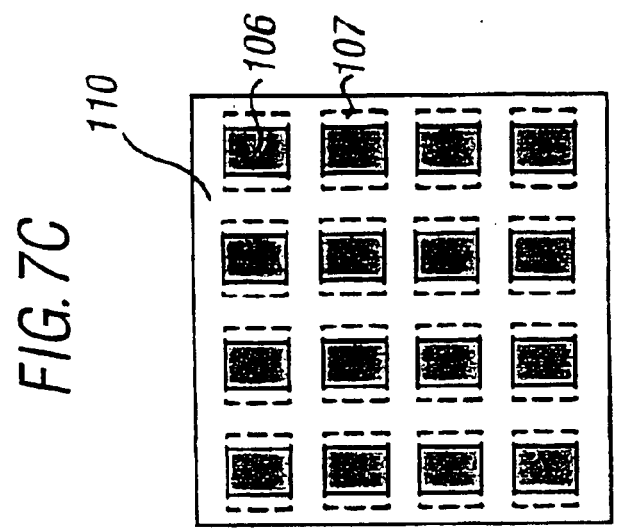
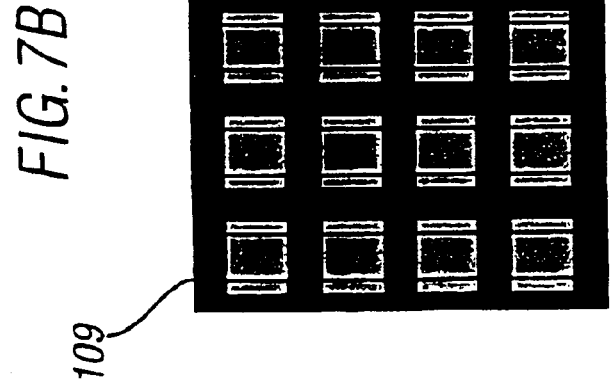
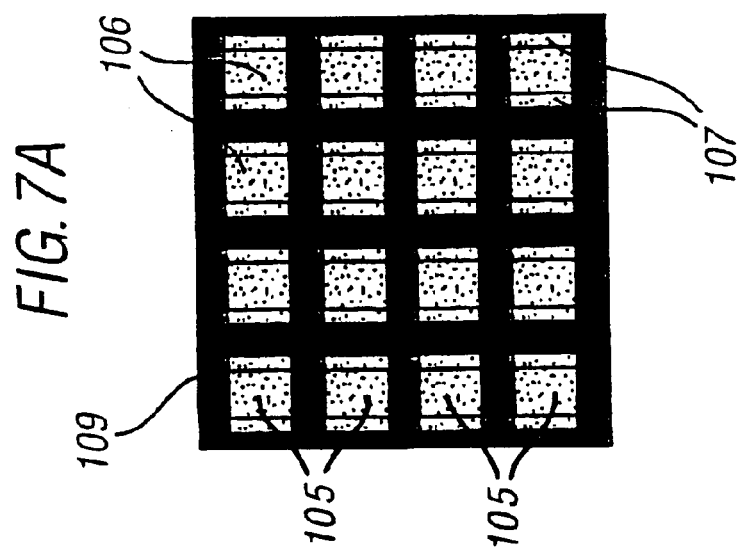

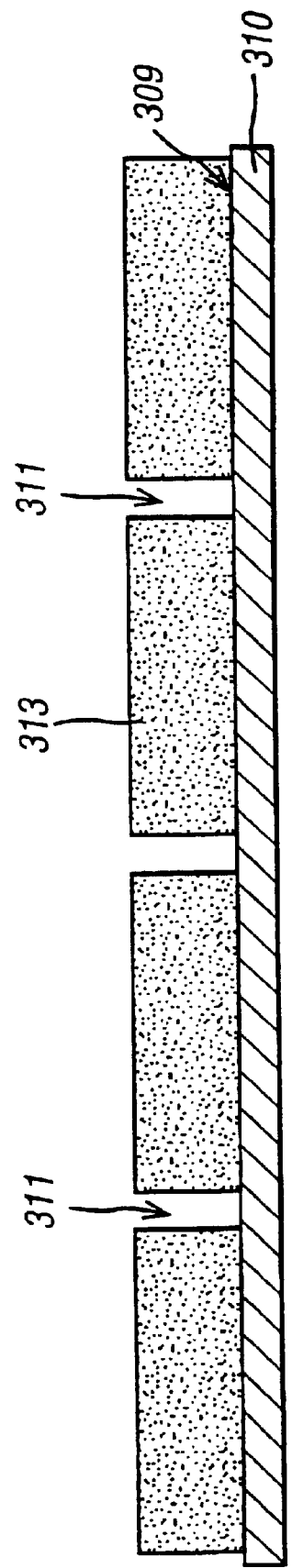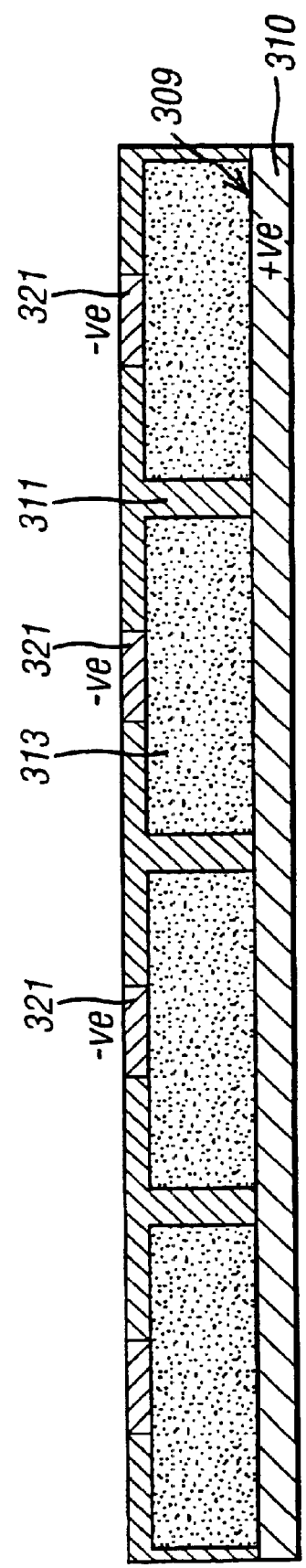

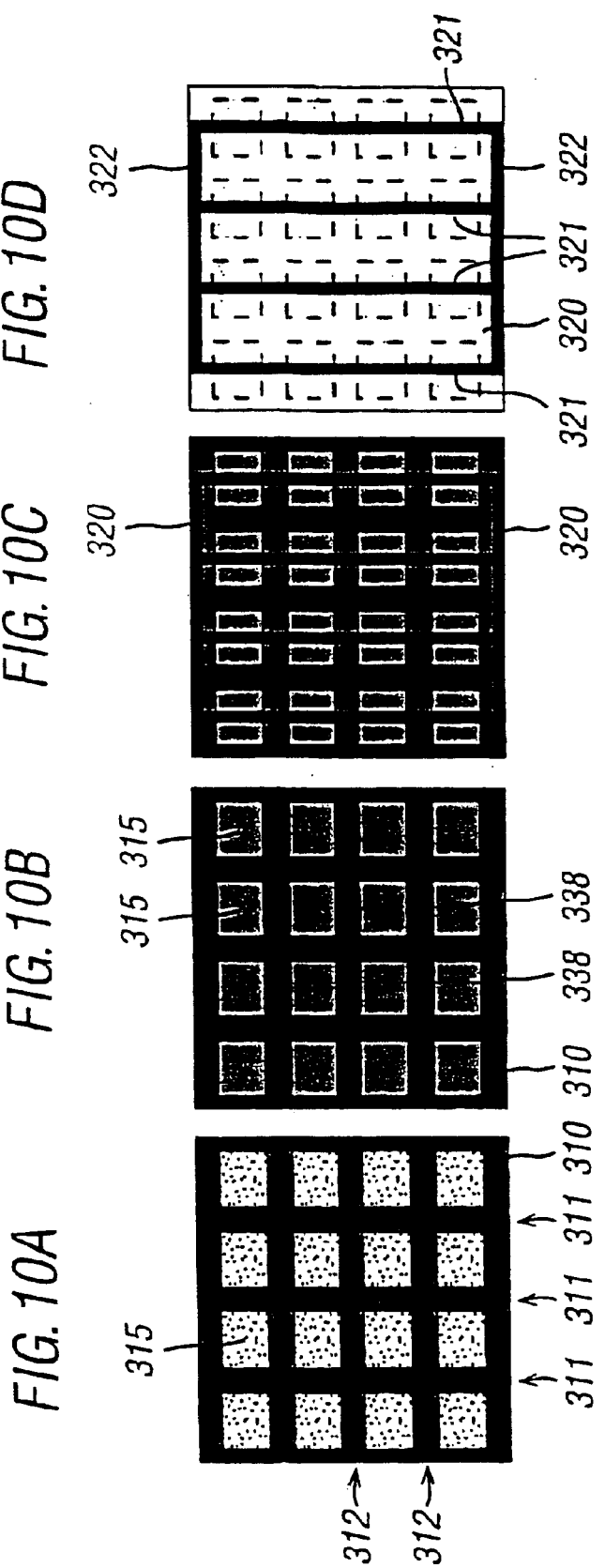

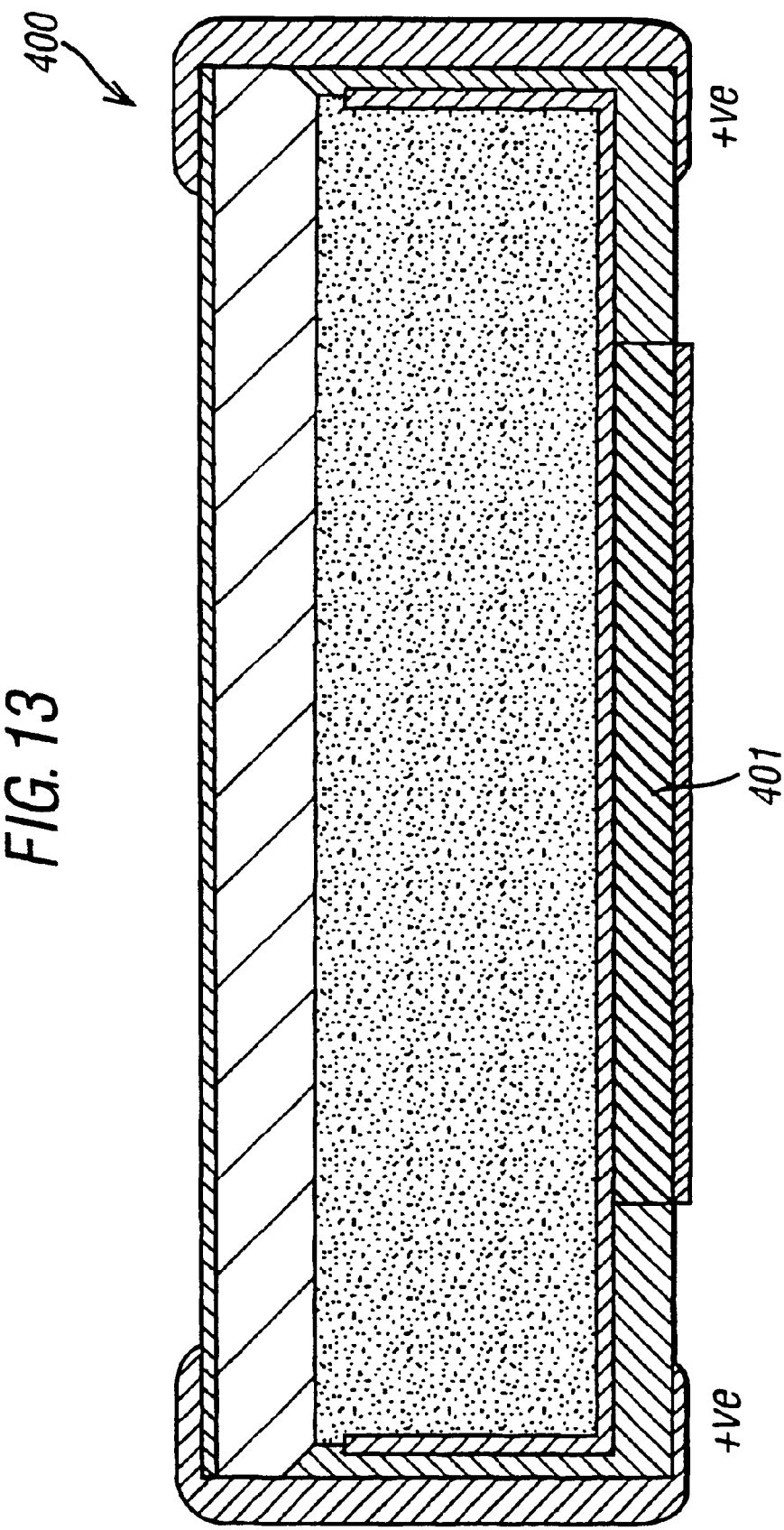

SOLID STATE CAPACITORS AND METHODS OF MANUFACTURING THEM

BACKGROUND OF THE INVENTION

The present invention relates to the field of solid state capacitors. The invention particularly relates to capacitors of the type in which a powder-formed valve action metal forms a highly porous anode body portion of a capacitor, an electrically insulating dielectric layer is formed through the porous structure of the anode body, and a conducting cathode layer is formed on the dielectric layer which layer is then electrically connected to a cathode terminal, the anode body being electrically connected to an anode terminal.

U.S. Pat. No. 5,357,399 (Salisbury) describes a method for simultaneously manufacturing multiple such capacitors from a porous tantalum layer sintered to a tantalum substrate. The layer is machined to form anode body portions of each capacitor. After processing a top plate (substrate lid) is bonded to the processed anode body top ends. The plate forms a lid which, after machining of the substrate/anode body/plate sandwich, becomes the cathode terminal of each capacitor. United Kingdom patent application no. 9824442.9 concerns a modified version of the Salisbury method in which the volumetric efficiency of the capacitors produced is optimized by removing the need for a substrate lid as the cathode terminal of each capacitor, thereby increasing the specific capacitive volume.

The foregoing methods permit the manufacture of very small but highly efficient capacitors. However the continued pressure of electronic circuit board design towards miniaturization of components and ease of assembly of such boards maintains a continued need for capacitors of improved volumetric efficiency and reduced component windows (or footprint) on the circuit board. There is a particular requirement for a method of producing capacitors which have a low profile on a circuit board, in some cases having a thickness of less than 1 mm.

SUMMARY OF THE INVENTION

The present invention seeks to provide improved capacitors and improved methods of manufacturing such capacitors.

According to one aspect of the present invention there is provided a method of manufacturing solid state capacitors comprising: providing an electrically conducting substrate; forming a plurality of porous bodies comprising valve action material on a surface of the substrate, the bodies each having an upper surface distal to the substrate; forming an electrically insulating layer over the bodies; forming a conducting cathode layer over the insulating layer applied to the bodies; and dividing the substrate into capacitor portions, each portion comprising a body and a portion of substrate, characterized in that an end region of each body portion distal from the substrate is provided with a platform which is locally raised with respect to the rest of the end region, the platform providing a cathode terminal site in the final capacitor, and the substrate portion providing an anode site.

The platform may consist of or be comprised of the porous valve action material from which the bodies are made. In this case the platform may be formed by green or post-sintered forming of the bodies integrally with the platform. Preferably the platform is formed by green molding of the bodies.

Alternatively the platform may be formed by machining of the sintered bodies. In yet another method the platform is formed by green forming of the platform onto pre-formed bodies.

In another aspect of the invention the platform comprises a solid conducting material. In this case the platform may be applied as a planar frame or lattice applied to upper end regions of the bodies, which frame or lattice is subsequently formed into individual platforms for each body.

In yet another aspect, the platform is formed from a conductive material applied as a coating or paste which solidifies to form the platform.

The method of the present invention will almost always further comprise encapsulating each capacitor body portion with a protective insulating material, leaving exposed an outer surface portion of the substrate and an outer surface portion of the platform.

It may be desired to form a capacitor with anode and cathode poles on a common face or side of the capacitor. Hence in yet another aspect of the invention a conducting bridge is applied to each capacitor, extending the anode terminal site over at least a portion of the encapsulation layer. Preferably the portion of the encapsulation layer to which is applied the conducting bridge includes a region adjacent the cathode site platform, whereby electrical anodic and cathodic terminal contact with the capacitors may be made on a common side of each capacitor at terminals corresponding to the platform and the encapsulated region adjacent the platform. The conducting bridge maybe formed by a conducting end cap applied to a sidewall of the capacitor portion, which end cap overlaps the substrate end of the capacitor and encapsulated portion of the platform end of the capacitor. In a preferred arrangement the conducting bridge comprises two end caps applied to opposite sidewalls, thereby to form two anode terminal contacts, one at side of the capacitor and overlapping the platform end of the capacitor.

Typically, the platforms take the form of rectilinear, circular or oval taps or steps. Usefully, the platform is generally centrally located on a substrate-distal end of each body. In one embodiment the platform is located at one side region of the substrate-distal end of each body.

In another aspect of the invention, two or more locally raised platforms are formed on the distal end of each anode body, thereby to form two or more cathode terminal sites on each body.

Generally, the bodies are arranged on the substrate in an array of rows and columns, and the dividing comprises cutting along the rows and columns as is conventional in the art.

The final processing step is usually a termination process. This applies solder-compatible coatings onto the cathode terminal sites on each platform and the cathode terminal sites. The termination process may comprise liquid coating of each terminal contact surface with conducting paste, and allowing the coating to solidify. In addition, or in the alternative, the termination treatment comprises metal plating to form a layer of metal or metals on the respective terminal sites.

The present invention also seeks to provide structurally novel and inventive capacitors, which may be manufactured according to the method of the present invention.

Hence according to a further aspect of the invention there is provided a solid state capacitor comprising: an electrically conducting substrate member; a porous body comprising valve action metal provided on a surface of the substrate; an electrically insulating layer formed over the free surface of the cathode and anode; a conducting cathode layer formed over the electrically insulating layer on the anode body and the cathode body; wherein the body has an upper surface distal to the substrate, which surface is formed with a locally raised platform with respect to the adjacent upper surface of the body, the locally raised portion providing a cathode terminal site and the substrate providing an anode terminal site.

Preferably the body is encapsulated by a sleeve of a protective insulating material, leaving exposed an outer surface portion of the substrate as the anode site and an outer surface portion of the platform as the cathode site.

A conducting bridge may extend between the anode site to an encapsulated surface portion of body, thereby to form an anode terminal extension contact on the encapsulated body portion. Preferably, the encapsulated surface portion at which the anode terminal contact is formed is located adjacent the cathode site corresponding to the platform, whereby both anode and cathode terminal contacts to a printed circuit board may be made on a common side of the capacitor.

The conducting bridge may comprise one or more conducting end caps applied to one side of each capacitor. The caps may be applied as a liquid conductive paste coating, by for example dipping.

The raised platform portion may be formed by molding of the porous bodies on the substrate. The molding may comprise pressing with a female die and punch arrangement. Alternatively, or in addition the raised portion may be formed by machining of pre-formed bodies.

In a preferred embodiment, the bodies each have a generally flat upper surface and the raised portion takes the form of a step in on the surface. The step may be generally centrally located on the upper surface. Alternatively the step may be located at one side region of the upper surface.

The method may further comprise providing a termination treatment to the exposed anode and cathode terminal contacts, the treatment facilitating soldered electrical connection of the capacitor with an electrical circuit.

Typically, the bodies are arranged on the substrate an array of rows and columns, and the dividing comprises cutting along the rows and columns.

The termination treatment may comprise liquid coating of each terminal contact surface with conducting paste, and allowing the coating to solidify. The termination treatment may further comprise electro-plating, sputter coating or vapor phase deposition on each solidified coating to form a layer of metallic material the respective terminals.

The method may include providing termination means on the terminal portions of the capacitors, thereby to facilitate electrical connection of the anode and cathode bodies to an electrical circuit.

The anode bodies may be arranged on the substrate in rows and columns, and the dividing may comprise cutting along rows and columns to separate the capacitors. The cutting is preferably carried out through a plane or planes perpendicular or substantially perpendicular to the plane of the substrate. The cutting may comprise grinding by for example a grinding wheel.

The capacitor bodies may each be formed from a pre-form layer of porous valve action material that has been applied to the substrate. The pre-form layer may be machined to form the bodies.

Preferably, before dividing, the substrate treated with a protective insulating material which infiltrates in between the bodies to encapsulate sidewalls of the bodies. The dividing process comprises cutting along the channels filled with protective material, thereby to leave a sidewall of protective material around each anode and cathode body of each cathode portion. The insulating material preferably also covers the upper surface of the bodies, other than the raised portion. Alternatively the encapsulation material may be allowed to completely cover the bodies. In this case a top layer of the encapsulation material is removed (by for example machining) to reveal the platform cathode sites.

The protective material may be a resin material which is infiltrated as a liquid and subsequently allowed to set. One suitable material is epoxy resin.

The termination coating may comprise a layer of material comprising a solid dispersion of conductive particles within a carrier matrix. The termination coating may further comprise a layer of metallic plate, such as nickel and tin layers.

Preferably respective exposed terminal sites on capacitors having common side terminals are generally coplanar so that the capacitor may stand on a flat surface with the cathode terminal and anode terminal contacting the flat surface. This makes the capacitor very well adapted for placement on and attachment to a circuit board.

The anode terminal body and the anode body may each be formed from a pre-form layer of porous valve action material that has been applied to the substrate. The pre-form may be applied by laying a green, un-sintered mixture of valve action metal powder and binder/lubricant on the substrate. The green mixture may then be sintered to fuse the powder into a solid highly porous pre-form, the binder/lubricant being removed by washing/dissolution of binder from the bodies before sintering.

The pre-form layer may be machined to form the anode terminal body and the anode body. Typically longitudinal and lateral grinding cuts may be employed in order to produce a network of rectilinear anode and cathode bodies on the substrate, separated "streets" corresponding to the path of the grinding cut. Naturally more complex shapes can be produced by conventional machining techniques, as required.

The insulating layer may be a dielectric layer of an oxide of the valve action metal, applied for example by conventional anodization techniques in order to build up gradually an oxide of the required thickness and integrity. In one example in which the valve action layer is tantalum, a layer of tantalum pentoxide is built up on the bodies.

The cathode layer may be applied by dipping of the anode and cathode bodies into a precursor solution of, for example manganese nitrate solution. The layer of manganese nitrate formed on the bodies may be heated to oxidize the nitrate to manganese dioxide. Repeated dipping steps may be necessary in order to build-up the optimum cathode layer.

Isolation cutting is typically carried out to remove all cathode layer material bridging the anode and cathode terminal portions of each capacitor. This may conveniently be achieved when the capacitors are undivided on the substrate by a machining cut along the channels separating individual bodies which extends through the cathode layer, and inevitably through the insulating dielectric layer also. To avoid the cutting process a masking resist layer may be laid in the region of the substrate between anode and cathode bodies, before the cathode layer is applied. Subsequent removal of the masking resist also removes unwanted excess cathode layer material.

Typically the termination process involves the application of a first layer of conducting carbon paste which is then cured. Next a second layer of conducting silver paste is applied, and cured. A further layer of metal plate may be applied, for example by electrodeposition. Typically layers of nickel and tin; a layer of tin/lead alloy; or a layer of gold is applied. This provides a solder-compatible surface for electrical connection.

Dividing of the substrate may be achieved by machining by for example a grinding cut. If necessary a rigid backing support may be provided for the substrate to as to provide the necessary structural rigidity to permit cutting without damaging the capacitors.

The material from which the capacitor is made is typically a valve action metal, especially tantalum. However other valve action materials are not excluded from the invention, and these may include metal oxide materials or other materials which the skilled person will recognize as being suitable for use in the processes of the present invention.

Following is a description by way of example only and with reference to the accompanying drawings of methods of putting the present invention into effect.

BRIEF DESCRIPTION OF THE SEVERAL VIEWS OF THE DRAWINGS

In the drawings:

FIG. 1A is a side view of a portion of a substrate according to the present invention;

FIG. 1B is a side view of a portion of the substrate after encapsulation;

FIGS. 3A, 3B and 4A, 4B show an unfinished and finished capacitor made according to the present invention;

FIGS. 5A, 5B, 5C and 5D show, respectively, underside, top face, side view and sectional views of a finished capacitor according to one embodiment of the present invention;

FIGS. 7A to 7C are plan views of a substrate under processing according to a second embodiment of the present invention;

FIGS. 9A and 9B are sectional views from one side of a substrate undergoing processing according to a third embodiment of the present invention;

FIGS. 10A to 10D are plan views of the substrate of FIG. 9 during the processing sequence;

FIG. 13 is a sectional view through a capacitor produced according to a fourth embodiment of the present invention;

DETAILED DESCRIPTION OF THE INVENTION

First embodiment

Figure 2:
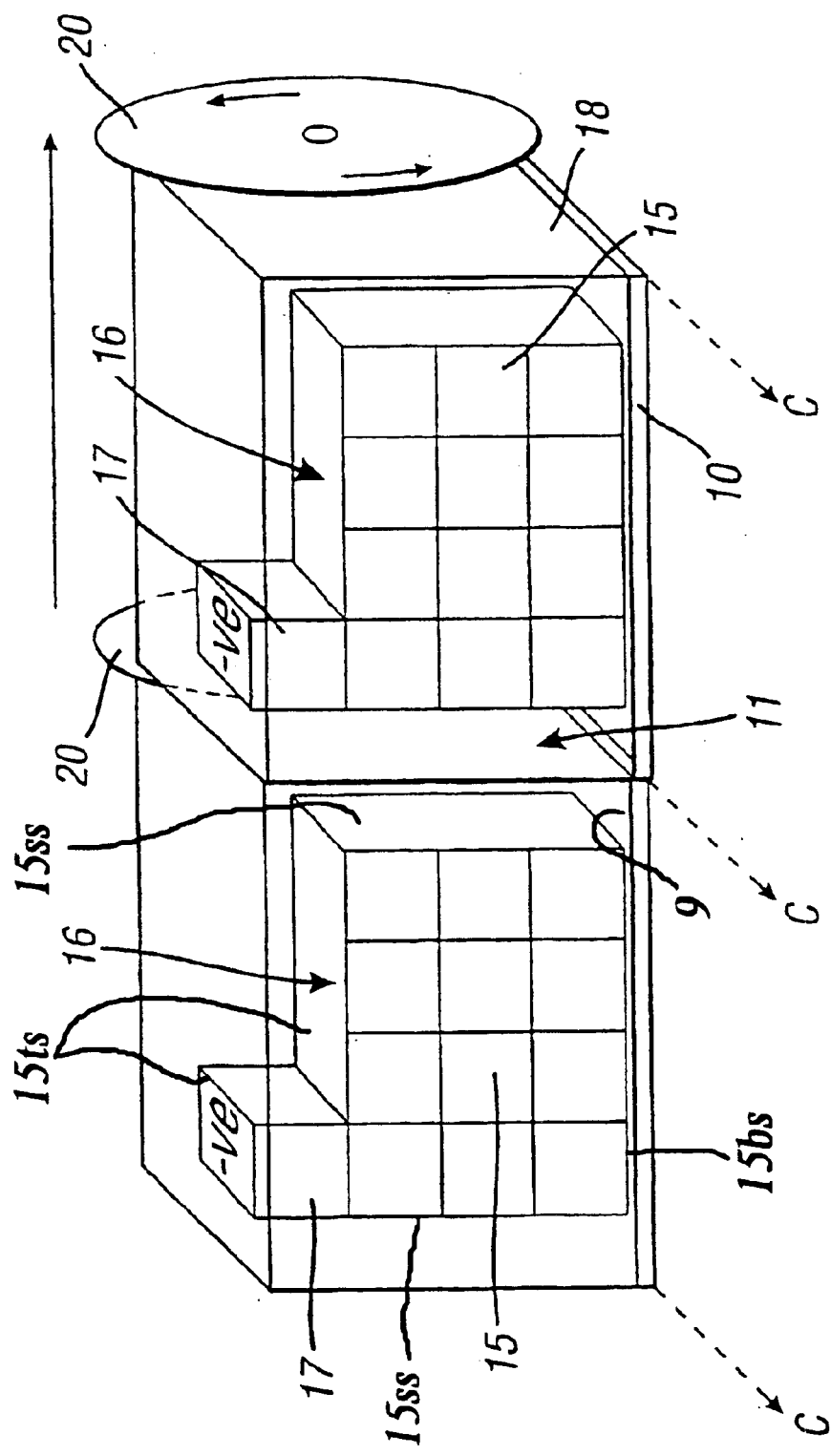
FIG. 2 is a perspective view of a small area of the substrate portion shown in FIG. 1.
Figure 6A:
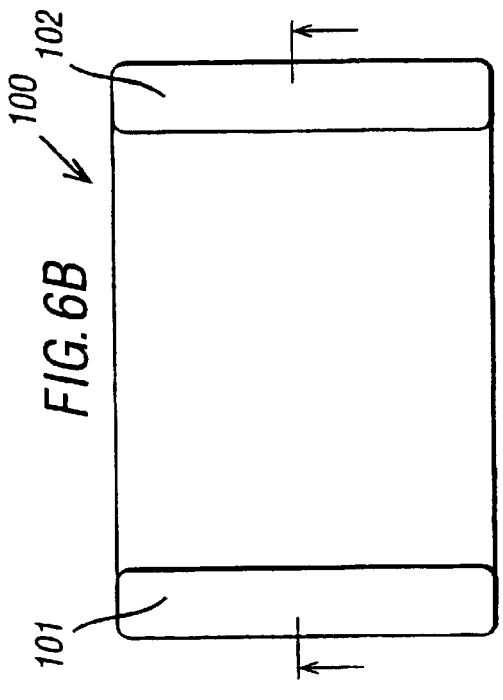
FIGS. 6A, 6B, 6C and 6D show, respectively, underside, top face, side view and sectional views of a finished capacitor according to another embodiment of the present invention.
Figure 6B:
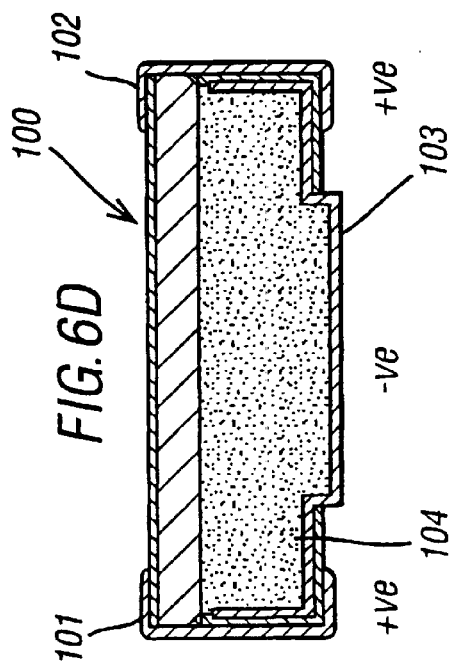
Figure 6C:
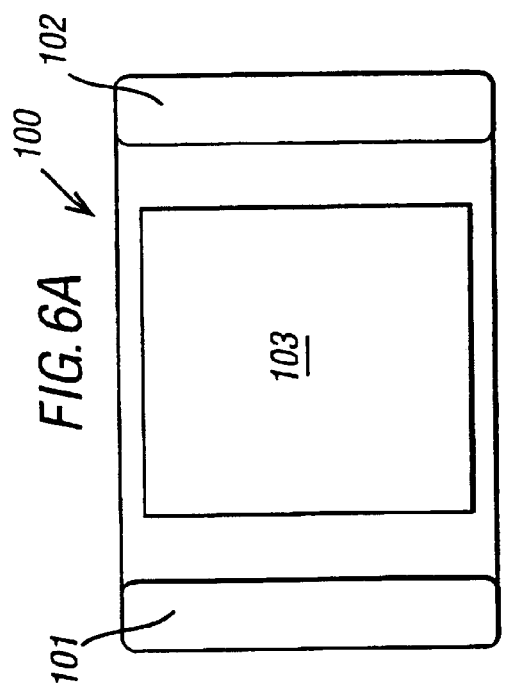
Figure 6D:
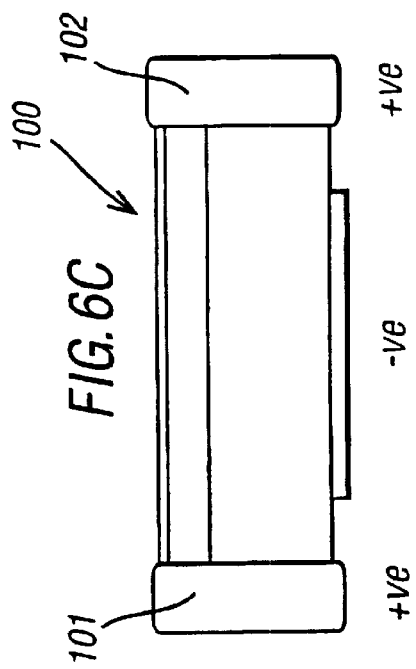

A solid substrate of, for example, 0.25 mm thick tantalum wafer 10 is shown in FIG. 1.

Substrate 10 is electrically conductive and has a substrate-top-surface 9, a substrate-bottom-surface 9b, and a plurality of substrate-side-surfaces 9s. The plurality of substrate-side-surfaces connect the substrate-top-surface 9 to the substrate-bottom-surface 9b. Top surface 9 of substrate 10 is covered with a dispersion of tantalum grains (not shown). The grains are fused to the tantalum wafer by sintering, thereby to form a seed layer (not shown). A conventional mixture of tantalum powder and binder/lubricant is then pressed onto the seed layer. The seed layer provides mechanical keying and enhances the bond between the green (un-sintered) powder and the substrate. The green powder mixture is then sintered to form an inter-connecting highly porous matrix of fused tantalum powder particles. The binder is burned off during the sintering process. This leaves a uniform anode-body layer of porous tantalum on the solid wafer.

The porous anode-body layer mixture is machined to form an orthogonal pattern of channels in rows 11 and columns (not shown). The effect of this is to produce an array of upstanding rectilinear bodies 15 on the substrate. The bodies 15 will form capacitive bulk in the final capacitors, so are termed either anode bodies 15 or simply bodies 15 hereafter.

Referring now to FIG. 2, anode bodies 15 comprise an anode-body-top-surface 15ts, an anode-body-bottom-surface 15bs, and a plurality of anode-body-side-surfaces 15ss, wherein said plurality of anode-body-side-surfaces 15ss connect said anode-body-top-surface 15ts to said anode-body-bottom-surface 15bs and wherein said anode-body-bottom-surface 15bs is attached to said substrate-top-surface 9.

The anode bodies 15 are further machined to form a step/platform 17 on each body upper surface region 16. The step/platform is an oblong feature which will form the cathode terminal in each capacitor produced. The step/platform may be produced by other methods, such as pressing/molding of the green flowable pre-form, although machining is described for this embodiment.

The substrate and its array of upstanding bodies 15 is then subjected to a conventional anodization treatment which forms a thin dielectric layer (not shown) of tantalum pentoxide on the tantalum of the substrate and through the porous network of the powder-formed bodies. Anodization may be repeated several times in order to build-up the required depth and integrity of dielectric layer. The dielectric layer forms an electrically insulating layer for providing capacitance in the final devices.

Next the substrate 10 and bodies 15 are coated with a cathode layer-forming solution of manganese nitrate. The solution enters into the porous network to form a manganese nitrate layer on the dielectric layer. The manganese nitrate is heated in an oxygen-containing atmosphere that oxidizes the manganese nitrate, forming manganese dioxide. The coating and heating process may be repeated in order to build up the required conductive layer thickness and integrity. The manganese dioxide layer is electrically conducting and provides a layer providing electrical contact with a cathode terminal in the final capacitors.

Respective layers of carbon and silver paste (shown as 38 in FIG. 3) are applied to the exposed top ends of the steps/platforms 17 and bodies in general. These layers provide a good electrical contact for the formation of cathode terminals on the final capacitors.

An epoxy resin liquid is infiltrated into the rows and columns to occupy the space in between bodies on the substrate. A lid (not shown) is placed on the body top ends, juxtaposed the steps/platforms 17, in order to constrain the resin to below the top ends of the steps/platforms. The resin is allowed to flow over the top surface 16 of each body, but prevented from covering the steps/platforms 17. The resin is allowed to set, the lid layer removed, to produce the arrangement shown in FIG. 1B, in which the resin is shown as 18.

The substrate is now divided, as shown in FIG. 2, to provide a plurality of individual capacitor portions. The division is conducted by means of a linear array of fine grinding wheels 20. Each cut follows along the center line of each row 11, through a plane perpendicular to the plane occupied by the substrate. Each column cut similarly follows the center-line of the column. Once cutting is complete, a plurality of unfinished capacitor bodies is left, one of which 34 is shown in FIG. 3. FIG. 3A is a top view of the unfinished capacitor, simply showing the diced substrate portion 35 of the capacitor. FIG. 3B is a sectional side view along the line AA'. The anode body 15 is surrounded by a sleeve of resin material 37. Each body is shown with the silver and carbon paste layers 38.

One end face 36 of the capacitor 34 is dipped into a liquid silver paste to coat the face and local region of the capacitor with an end cap 39, as shown in FIGS. 4A and 4B. The coating provides a conductive bridge between the substrate 35 and the under-face 40 of the capacitor.

In order to finish the capacitor a metal plate layer is applied to the exposed surfaces 39, 41 of the respective anode and cathode bodies. This can be applied by known methods such as electro-deposition and sputter coating. In a preferred arrangement a layer of nickel is applied followed by a tin-lead layer. The metal plate layer provides a solder compatible surface permitting soldering of the component to a printed circuit board. FIGS. 5A–5D shows the final capacitor.

Second Embodiment

FIG. 6 shows an alternative capacitor 100 according to the present invention. Each capacitor is formed with two anode terminals 101, 102. In between these two anode terminals is a cathode terminal 103. It will be appreciated that the alteration to the process will involve forming the steps/platforms in a central region of the body upper surface 104 (FIG. 6D). In addition two end-caps are formed on each end of the capacitor by dipping of the capacitor ends in silver paste, and preferably also final (Ni/Sn) metal plating to form a solder compatible contact.

An advantage of this design configuration is that the capacitor has a central underside cathode terminal contact, and an anode terminal contact at each end region. This means that the capacitor is not prone to placement on a PCB in an incorrect orientation because both end regions have the same polarity. This makes automated capacitor attachment to a PCB simpler as the component is effectively polarity insensitive.

The steps involved in the manufacture of this embodiment are illustrated in FIGS. 7A to 7C. FIG. 7A is a plan view of a tantalum substrate 109. The array is formed with a layer of sintered porous tantalum, in much the same manner as for example 1. Again, this is machined into an array of bodies 105. In this case the array is a four by four matrix of rectilinear upstanding bodies 105. Each body is further machined to remove material from two side regions 107 of each upstanding end of the bodies, thereby leaving an oblong central platform 106 on each body end. The substrate and its array of bodies is then processed by anodization to form a dielectric layer, followed by magnetization to form a cathode conductive layer, isolation cutting, reformation of the dielectric, and then carbon and silver coating of the end region of the bodies (as per example 1). This leaves a coated array as shown in FIG. 7B. A lid layer (not shown) is then applied to the upper ends of the bodies, and clamped in position. The space in between the bodies sandwiched between the substrate and the lid is then infiltrated with a liquid resin 110 (epoxy) which is then allowed to solidify. After solidification the lid is removed to leave an array of encapsulated bodies, for each of which two side regions 107 are covered with a film of encapsulation material, and the central platform is left un-encapsulated.

Figure 8:
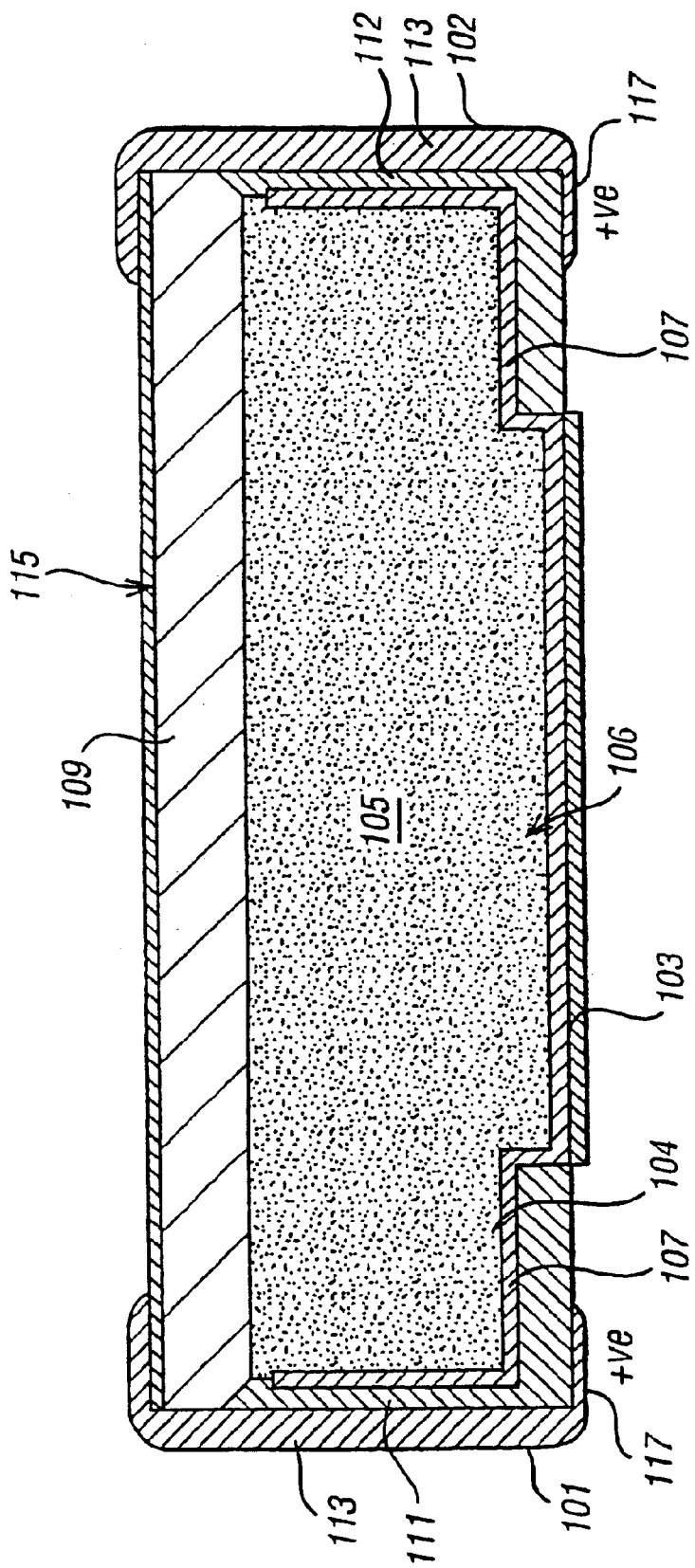
FIG. 8 is a sectional view through a capacitor formed by the method of FIG. 7.

The substrate is then divided into individual capacitor units, one of which is shown in section in FIG. 8. Each unit undergoes a termination process in which terminals are applied to the anode and cathode portions to form solder compatible contacts. The exposed substrate surface 115 is sputter coated with Ni & Sn layers to provide a protective coat. At each end 111 and 112 an end cap 113 of adhesive paste (e.g. silver paste) is applied. The end cap provides a conductive bridge between the tantalum substrate 109 and the underside 116 of the capacitor device, so that anode terminals 117 are formed on a common side with the cathode terminal 103. The end caps and the platform 106 are each coated with nickel/tin layers to form a solder compatible contact to facilitate connection to a PCB.

Third embodiment

The third embodiment, shown in FIG. 9A et seq., is an alternative method of forming the cathode platform feature. As with embodiments 1 & 2 a solid substrate of, for example, 0.25 mm thick tantalum wafer 310 has a top surface 309, which surface is covered with a dispersion of tantalum grains (not shown). The grains are fused to the tantalum wafer by sintering, thereby to form a seed layer (not shown). A conventional mixture of tantalum powder and binder/lubricant is then pressed onto the seed layer. The seed layer provides mechanical keying and enhances the bond between the green (un-sintered) powder and the substrate. The green powder mixture is then sintered to form an inter-connecting highly porous matrix of fused tantalum powder particles. The binder is removed by a wash/dissolution process such as is described in our PCT application GB98/00023 (inventor Ian Bishop) before the sintering process. This leaves a uniform layer of highly porous tantalum 313 on the solid wafer.

The porous layer mixture is machined to form an orthogonal pattern of channels in rows 312 and columns 311, as shown in FIG. 10A. The effect of this is to produce an array of upstanding rectilinear bodies 315 on the substrate. The bodies 315 will form capacitive bulk in the final capacitors, and are termed anode bodies hereafter.

As for the examples 1 & 2, the substrate and its array of upstanding bodies 315 is then subjected to a conventional anodization treatment which forms a thin dielectric layer (not shown) of tantalum pentoxide on the tantalum of the substrate and through the porous network of the powder-formed bodies. Anodization may be repeated several times in order to build-up the required depth and integrity of dielectric layer. The dielectric layer forms an electrically insulating layer for providing capacitance in the final devices.

Next the substrate 310 and bodies 315 are coated with a cathode layer-forming solution of manganese nitrate. The solution enters into the porous network to form a manganese nitrate layer on the dielectric layer. The manganese nitrate is heated in an oxygen-containing atmosphere that oxidizes the manganese nitrate, forming manganese dioxide. The coating and heating process may be repeated in order to build up the required conductive layer thickness and integrity. The manganese dioxide layer is electrically conducting and provides a layer providing electrical contact with a cathode terminal in the final capacitors. After application of the magnetization layer, conventional isolation cuts are made along the bottom of the channels between anode bodies, which cuts (by for example shallow sawing/grinding) remove any stray manganese dioxide bridging between the anode body and the tantalum substrate. If left these would cause a short in the final capacitors, making them useless. The cuts also inevitably remove the underlying insulating dielectric layer, so a "reformation" process is carried out to reform the tantalum pentoxide layer in the region of the isolation cuts.

Respective cap layers of carbon and silver paste (shown as 338 in FIG. 10B) are applied (by for example dipping) to the exposed top end regions of the bodies. These layers provide a good electrical contact for the formation of cathode terminals on the final capacitors.

In the present embodiment, rather than machining the bodies to form a step/platform 17 (FIG. 1B) or platform 106 (FIG. 7A) as per embodiments 1 & 2 on each body upper surface, the steps/platforms are formed en masse by attachment of a planar alloy frame 320 to the upper surface. The frame may be made for example from alloy 42 (nickel/iron). The frame is made up of four lateral portions 321 and two orthogonal edge portions 322. One surface of each lateral portion is coated with silver adhesive paste along its length. This adhesive surface is then juxtaposed the top ends of the anode bodies, as shown in FIG. 10C. The lateral portions are aligned over a central region of each body top end as shown in the FIG. 10C. The adhesive is allowed to set, bonding the frame to the anode bodies. A lid layer (not shown) is then applied and clamped to the alloy flame. An epoxy encapsulation resin is then infiltrated between the bodies and coating the exposed upper surfaces of each anode body. On removal of the lid layer the frame 320 is the only portion left un-coated with resin, as shown in FIG. 10D.

Figure 11:
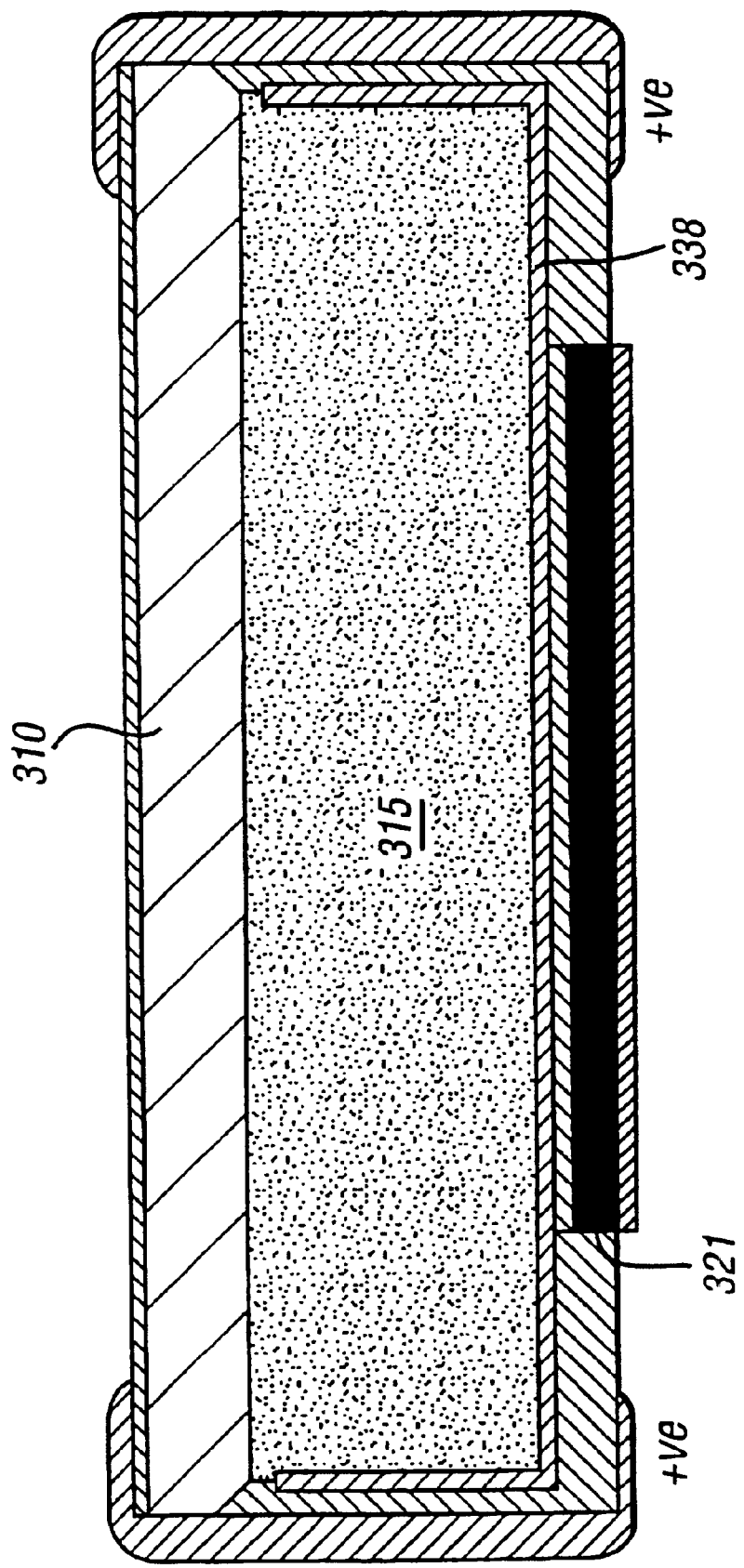
FIG. 11 is a sectional view through a capacitor produced according to the third embodiment of the invention.
Figure 12B:
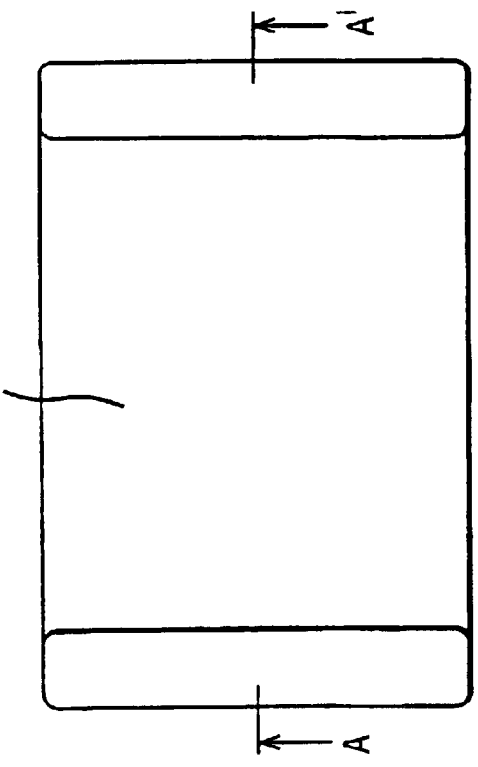
FIG. 12 shows plan, side and sectional AA' views through the capacitor of FIG. 11.
Figure 12A:
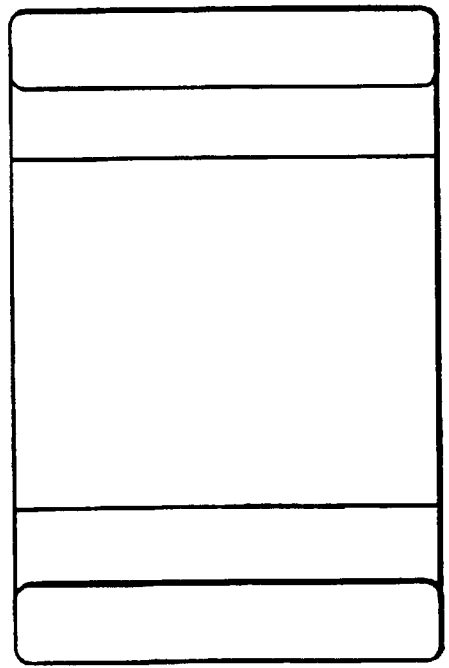
Figure 12D:
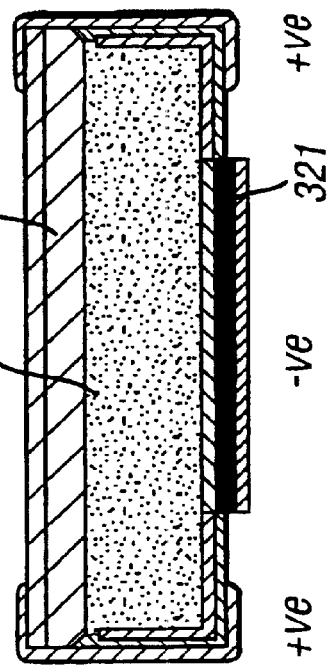
Figure 12C:
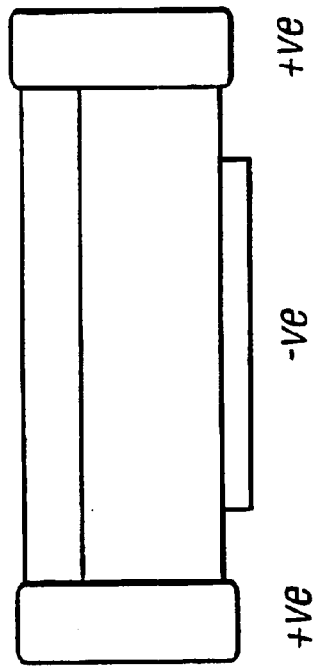

The substrate is then divided into individual capacitors, in which the alloy frame portions 321 form the cathode platforms, as shown in FIG. 11. The termination process is completed as per example 3 to produce a capacitor of outwardly identical configuration.

In order to finish the capacitor a metal plate layer is applied to the exposed surfaces of the respective anode and cathode portions. This can be applied by known methods such as electro-deposition and sputter coating. In a preferred arrangement a layer of nickel is applied followed by a tin-lead layer. The metal plate layer provides a solder compatible surface permitting soldering of the component to a printed circuit board.

The final configuration is shown in FIGS. 12A–12D.

Fourth Embodiment

An alternative process for forming the cathode platform involves building up a layer of conductive paste on each anode body of the array. The process proceeds as per example 3 until a frame is applied to the array of bodies. At this point a conductive pad of adhesive silver paste is applied by stenciling to a central portion of each anode end surface. Several layers of adhesive may be applied to form the desired height of cathode platform. Once the pads have cured, the process continues as per example 3 to produce a capacitor in which the conductive paste pad replaces the alloy platform of example 3. FIG. 13 shows a capacitor 400 in which the adhesive pad is labeled 401.

Figure 14:
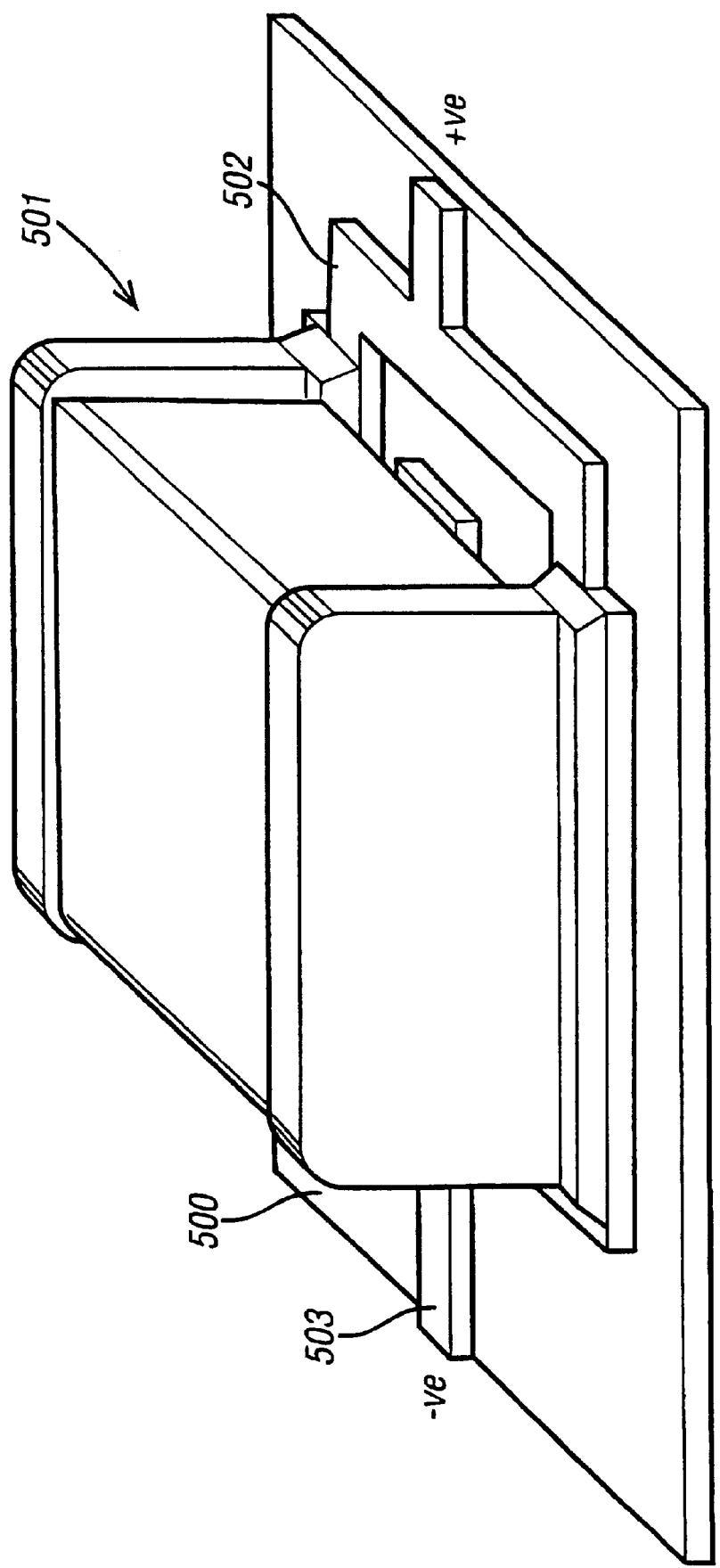
FIG. 14 is a perspective view of a capacitor according to the present invention attached to a printed circuit board.

FIG. 14 is a perspective view of a capacitor 501 produced by any of examples 2 to 4. Capacitor 501 is shown in place on a section of printed circuit board PCB 500. The PCB has a U-plan positive rail 502 and an elongate negative rail 503. The U-plan rail contacts each of the end anode regions of the capacitor 504, 505. The elongate rail 503 contacts the cathode platform contact surface (obscured) of the capacitor.

Fifth Embodiment

Figure 15:
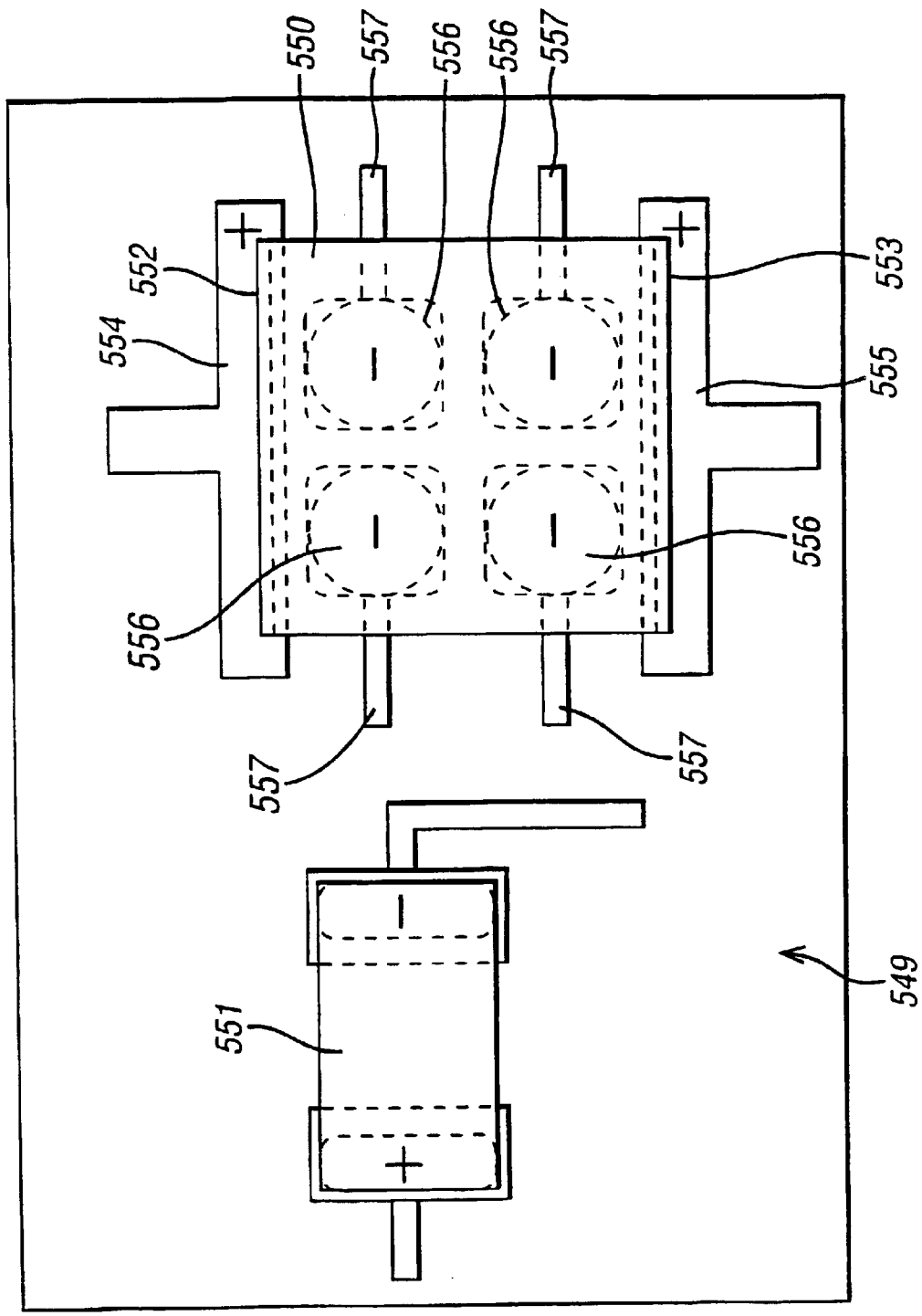
FIG. 15 is a plan view of a PCB provided with a prior art capacitor and a capacitor according to a fifth embodiment of the invention.

The foregoing examples have shown methods of manufacturing capacitors, each having a single cathode terminal and one or two anode terminals. It is within the scope of the present invention to provide a capacitor having an array of cathode terminals by forming a plurality of platforms on the anode body by the same methods, mutatis mutandis, as are described in the foregoing specific description. FIG. 15 shows a PCB 549 upon which are mounted such a capacitor 550 next to a conventional prior art solid state tantalum anode capacitor 551. The capacitor has two anode terminals 552, 553 at opposite sides thereof. These contact corresponding PCB anode tracks 554, 555 on the PCB. There are four cathode terminals 556 formed on the underside of the capacitor. Each of these terminals may be formed by the methods of any of examples 1 to 4 of the foregoing, via: machining of the anode body, application of a solid metal plate to the anode body, application of a conductive paste tab. These terminals are aligned with four separate cathode terminal tracks 557 on the PCB.

The invention described herein provides, inter alia, methods particularly useful for producing low-profile (thin) capacitors having terminals which may be arranged on a common face of the capacitor.

What is claimed is:

1. A method of manufacturing solid state capacitors comprising:

providing an electrically conducting substrate;

forming a plurality of porous bodies comprising valve action material on a surface of the substrate, the porous bodies each having an upper surface distal to the substrate;

forming an electrically insulating layer over the porous bodies;

forming a conducting cathode layer over the insulating layer; and dividing the substrate so as to make a plurality of capacitor-bodies, each capacitor-body comprising a porous-body-portion and a substrate-portion, said substrate-portion being a section of the electrically conducting substrate and said porous-body-portion comprising an electrically insulating layer and a conducting cathode layer, wherein an end region of each porous-body-portion distal from the substrate-portion is provided with a platform which is locally raised with respect to the rest of the end region, the platform providing a cathode terminal site and the substrate-portion providing an anode terminal site.

2. A method as claimed in claim 1, wherein the platform comprises the porous valve action material from which the porous bodies are made.

3. A method as claimed in claim 1, wherein the platform is formed by green or post-sintered forming of the porous bodies.

4. A method as claimed in claim 1, wherein the platform is formed by green molding of the porous bodies.

5. A method as claimed in claim 1, wherein the porous bodies are formed using a sintering process and wherein the platform is formed by machining of the sintered porous bodies.

6. A method as claimed in claim 1, wherein the platform is formed by green forming of the platform onto preformed bodies.

7. A method as claimed in claim 1, wherein the platform comprises a solid conducting material.

8. A method as claimed in claim 1, wherein the platform is planar frame or lattice applied to upper end regions of the porous bodies wherein the frame or lattice is subsequently formed into individual platforms.

9. A method as claimed in claim 8, wherein the frame or lattice comprises a solid metal or metal alloy planar sheet.

10. A method as claimed in claim 1, wherein the platform is formed from a conductive material applied as a coating or paste which solidifies to form the platform.

11. A method as claimed in claim 1, further comprising the step of encapsulating said plurality of porous bodies and at least a portion of said substrate, with a protective insulating material thereby forming an encapsulation layer, said encapsulation layer leaving exposed at least a portion of the outer surface of each platform and at least a portion of the substrate.

12. A method as claimed in claim 11, wherein at least one conducting bridge is applied to each capacitor, said conducting bridge extending from an anode terminal site to a site on said encapsulation layer, so as to form at least one anode terminal site on a portion of the encapsulation layer.

13. A method as claimed in claim 12, wherein the portion of the encapsulation layer to which is applied the conducting bridge includes a region adjacent the cathode terminal site, whereby electrical anodic and cathodic terminal contact with the capacitor-bodies may be made on a common side of each capacitor-body.

14. A method as claimed in claim 12, wherein the conducting bridge is formed by a conducting end cap applied to a sidewall of the capacitor-body, wherein said end cap overlaps an anode terminal site and an encapsulated portion of the region adjacent to a cathode terminal site.

15. A method as claimed in claim 14, wherein the conducting bridge comprises two end caps applied to opposite sidewalls of the capacitor-body thereby forming two anode terminal sites, on the platform side of the capacitor-body.

16. A method as claimed in claim 1, wherein the platforms take the form of at least one member of the group consisting of: rectilinear; circular; oval tabs; and steps.

17. A method as claimed in claim 1, wherein the platform is generally centrally located a region of each porous-body-portion distal from the substrate portion.

18. A method as claimed in claim 1, wherein the platform is located at one side region of the substrate-distal end of each porous-body-portion.

19. A method as claimed in claim 1, wherein the porous-bodies are arranged on the substrate in an array of rows and columns, and the step of separating comprises cutting along the rows and columns.

20. A method as claimed in claim 1, wherein a termination process applies solder-compatible coatings onto the anode terminal sites and the cathode terminal sites.

21. A method as claimed in claim 20, wherein the termination process comprises liquid coating of each terminal contact surface with conducting paste, and allowing the coating to solidify.

22. A method as claimed in claim 20, wherein the termination treatment comprises metal coating each terminal contact to form a layer of metal or metals on the respective terminal sites.

23. A method as claimed in claim 1, wherein two or more locally raised platforms are formed on the distal end of each porous-body, thereby forming two or more cathode terminal sites on each porous-body-section.

24. A solid state capacitor comprising:
an electrically conducting substrate;
a porous body comprising valve action metal provided on a surface of the substrate;
an electrically insulating layer covering substantially all of the outer surface of the porous body;
a conducting cathode layer covering substantially all of the electrically insulating layer;
wherein the porous body has an upper surface distal to the substrate, said upper surface comprising a platform region and a lower region wherein said lower region is adjacent to said platform region and wherein said platform region is locally raised with respect to said lower region, said platform region providing a cathode terminal site and the substrate providing an anode terminal site.

25. A capacitor as claimed in claim 24, wherein at least a portion of the exposed surfaces of the electrically conducting substrate and the exposed surfaces of the porous body, said porous bodies comprising an electrically insulating layer and an conducting cathode layer, are encapsulated by a protective insulating material, leaving exposed an anode terminal site and a cathode terminal site.

26. A capacitor as claimed in claim 25, wherein a conducting bridge extends from the anode terminal site to an encapsulated surface portion of said lower region thereby forming a anode terminal site on the platform side of the capacitor.

27. A capacitor as claimed in claim 25, wherein said anode terminal site is located adjacent to the cathode terminal site, whereby both anode and cathode terminal contacts to a printed circuit board may be made on a common side of the capacitor.

28. A capacitor as claimed in claim 26, wherein the conducting bridge comprises a conducting end cap applied to one side of the capacitor.

29. A capacitor as claimed in claim 28, wherein the conducting bridge comprises two or more end caps applied to opposite sides of the capacitor.

30. A method of manufacturing solid state capacitors comprising:
providing an electrically conducting substrate, said substrate comprising a substrate-top-surface, a substrate-bottom-surface, and a plurality of substrate-side-surfaces wherein said plurality of substrate-side-surfaces connect the substrate-top-surface to the substrate-bottom-surface;
providing an anode-body layer, wherein said anode-body layer is attached to said substrate-top-surface;
dividing the anode-body layer into a plurality of discrete anode-bodies, wherein each anode-body comprises an anode-body-top-surface, an anode-body-bottom-surface, and a plurality of anode-body-side-surfaces, wherein said plurality of anode-body-side-surfaces connect said anode-body-top-surface to said anode-body-bottom-surface and wherein said anode-body-bottom-surface is the anode-body surface attached to said substrate-top-surface;
wherein each anode-body-top-surface is provided with at least one platform, said at least one platform located adjacent to at least one lower-region of said anode-body-top-surface, wherein the at least one platform is elevated relative to the at least one lower-region;
forming an electrically insulating layer over each unattached surface of said plurality of discrete anode-bodies and the exposed areas of the substrate-top-surface;
forming a conducting layer that covers substantially all of the insulating layer;
forming an encapsulation layer over the plurality of discrete anode-bodies and the exposed surfaces of the electrically conducting substrate, said encapsulation layer leaving exposed a portion of the platform and a portion of electrically conducting substrate, said plurality of discrete anode-bodies comprising an electrically insulating layer and a conducting layer;

creating a plurality of individual capacitor-bodies by dividing said electrically conducting substrate along a line between each adjacent anode-body such that each capacitor-body comprises, an anode-body attached to a substrate-portion, said substrate-portion being a portion of said electrically conducting substrate; and wherein the at least one platform of each anode-body provides for at least one cathode-terminal-site and the substrate-portion provides for at least one anode-terminal-site.

31. A method of manufacturing solid state capacitors as in claim 30, wherein said encapsulation layer comprises a protective insulating material, said encapsulation layer defining at least one of:

(a) an unencapsulated region on at least a portion of an outer surface of at least one platform of each discrete anode-body;

(b) an unencapsulated region on the substrate-bottom-surface;

(c) a completely unencapsulated substrate-bottom-surface; and (d) a completely encapsulated substrate-bottom-surface.

32. A method of manufacturing solid state capacitors as in claim 30, wherein said anode-body layer is a substantially uniform porous body comprising valve action material and formed using a sintering process.

33. A method of manufacturing solid state capacitors as in claim 32, wherein the at least one platform is formed by a process comprising at least one member from the group consisting of: (a) molding green flowable pre-form; (b) post-sintered forming; (c) machining the anode-body layer; and (d) green forming of the platform onto preformed anode-body layers.

34. A method of manufacturing solid state capacitors as in claim 30, wherein the at least one platform comprises at least one member from the group consisting of: (a) porous valve action material; (b) a solid conducting material; (c) a planar frame or lattice applied to the anode-body-top-surface, wherein the frame or lattice is subsequently formed into platforms; and (d) a conductive material applied as a coating or paste on the anode-body-top-surface which solidifies to form the platform.

35. A method of manufacturing solid state capacitors as in claim 34, wherein the frame or lattice comprises a solid metal or metal alloy planar sheet.

36. A method of manufacturing solid state capacitors as in claim 30, wherein a conducting bridge is applied to the capacitor-body, said conducting bridge extending from an unencapsulated region of the substrate-bottom-surface to a location on the encapsulation layer, thereby forming an anode-terminal-site on the encapsulation layer.

37. A method of manufacturing solid state capacitors as in claim 36, wherein the portion of the encapsulation layer to which the conducting bridge is applied is a lower-region adjacent to a cathode-terminal-site, whereby electrical anodic and cathodic terminal contact with the capacitor-body may be made on a common side of each capacitor-body.

38. A method of manufacturing solid state capacitors as in claim 36, wherein the conducting bridge is formed by dipping a side of a capacitor-body into a conductive paste so as to form an end cape on a sidewall of the capacitor-body, wherein said end cap overlaps a portion of an unencapsulated region of the substrate-bottom-surface and an encapsulated portion of the anode-body-top-surface.

39. A method of manufacturing solid state capacitors as in claim 30, wherein the anode-bodies are arranged on the electrically conducting substrate in an array of rows and columns, and wherein the step of dividing said electrically conducting substrate comprises cutting along the rows and columns.

40. A method of manufacturing solid state capacitors as in claim 30, further comprising the step of performing a termination process, said termination process comprising at least one of the following steps: (a) applying a solder-compatible coating onto the at least one anode-terminal-site and onto the at least one cathode-terminal-site; (b) liquid coating of each anode and cathode terminal contact surface with conducting paste and allowing the coating to solidify; (c) metal coating each anode and cathode terminal site to form a layer of metal or metals on the respective terminal sites.

41. A method of manufacturing solid state capacitors as in claim 40, further comprising the step of forming at least one conducting bridge extending from an unencapsulated portion of the substrate-bottom-surface to at least two encapsulated lower-regions.

42. A method of manufacturing solid state capacitors as in claim 30, wherein said at least one platform is generally centrally located on said anode-body-top-surface such that said anode-body-top-surfaces comprises at least on platform-region between at least two lower-regions.

43. A method of manufacturing solid state capacitors comprising:

providing an electrically conducting substrate, said substrate comprising a substrate-top-surface, a substrate-bottom-surface, and a plurality of substrate-side-surfaces wherein said plurality of substrate-side-surfaces connect the substrate-top-surface to the substrate-bottom-surface;

providing an anode-body layer, wherein said anode-body layer is attached to said substrate-top-surface;

dividing the anode-body layer into a plurality of discrete anode-bodies, wherein each anode-body comprises an anode-body-top-surface, an anode-body-bottom-surface, and a plurality of anode-body-side-surfaces, wherein said plurality of anode-body-side-surfaces connect said anode-body-top-surface to said anode-body-bottom-surface and wherein said anode-body-bottom-surface is the anode-body surface attached to said substrate-top-surface;

wherein each anode-body-top-surface is provided with at least one platform, said at least one platform located adjacent to at least one lower-region of said anode-body-top-surface, wherein the at least one platform is elevated relative to the at least one lower-region;

forming an electrically insulating layer over each unattached surface of said plurality of discrete anode-bodies and the exposed areas of the substrate-top-surface;

forming a conducting layer that covers substantially all of the insulating layer;

creating a plurality of individual capacitor-bodies by dividing said electrically conducting substrate along a line between each adjacent anode-body such that each capacitor-body comprises an anode-body attached to a substrate-portion; and wherein the at least one platform of each anode-body provides for at least one cathode-terminal-site and the substrate-portion provides for at least one anode-terminal-site.

44. A method of manufacturing solid state capacitors as in claim 43, wherein said anode-body layer is a substantially uniform porous body comprising valve action material and formed using a sintering process.

45. A method of manufacturing solid state capacitors as in claim 44, wherein the at least one platform is from by a process comprising at least one member from the group consisting of: (a) molding green flowable pre-form; (b) post-sintered forming; (c) machining the anode-body layer; and (d) green forming of the platform onto preformed anode-body layers.

46. A method of manufacturing solid state capacitors as in claim 43, wherein the at least one platform comprises at least one member from the group consisting of: (a) the porous valve action material from which the anode-body layer is made; (b) a solid conducting material; (c) a planar frame or lattice applied to the anode-body-top-surface, wherein the frame or lattice is subsequently formed into platforms; and (d) a conductive material applied as a coating or paste on the anode-body-top-surface which solidifies to form the platform.

47. A method of manufacturing solid state capacitors as in claim 46, wherein the frame or lattice comprises a solid metal or metal alloy planar sheet.

48. A method of manufacturing solid state capacitors as in claim 43, further comprising the step of forming an encapsulation layer over the discrete anode-body and the exposed surfaces of the electrically conducting substrate, said encapsulation layer comprising a protective insulating material, said encapsulation layer further defining at least one of:
(a) an unencapsulated region on at least a portion of an outer surface of at least one platform of each discrete anode-body,
(b) an unencapsulated region on the substrate-bottom-surface;
(c) a completely unencapsulated substrate-bottom-surface; and
(d) a completely encapsulated substrate-bottom-surface.

49. A method of manufacturing solid state capacitors as in claim 48, wherein a conducting bridge is applied to the capacitor-body, said conducting bridge extending from an unencapsulated region of the substrate-bottom-surface to a location on the encapsulation layer, thereby forming an anode-terminal-site on the encapsulation layer.

50. A method of manufacturing solid state capacitors as in claim 49, wherein the portion of the encapsulation layer to which the conducting bridge is applied is a lower-region adjacent to a cathode-terminal-site, whereby electrical anodic and cathodic terminal contact with the capacitor-body may be made on a common side of each capacitor-body.

51. A method of manufacturing solid state capacitors as in claim 49, wherein the conducting bridge is formed by dipping a side of a capacitor-body into a conductive paste so as to form an end cape on a sidewall of the capacitor-body, wherein said end cap overlaps a portion of an unencapsulated region of a substrate surface and an encapsulated portion of the anode-body-top-surface.

52. A method of manufacturing solid state capacitors as in claim 43, wherein the anode-bodies are arranged on the electrically conducting substrate in an array of rows and columns, and wherein the step of dividing said electrically conducting substrate comprises cutting along the rows and columns.

53. A method of manufacturing solid state capacitors as in claim 43, further comprising the step of performing a termination process, said termination process comprising at least one of the following steps: (a) applying a solder-compatible coating onto the at least one anode-terminal-site and onto the at least one cathode-terminal-site; (b) liquid coating of each anode and cathode terminal contact surface with conducting paste and allowing the coating to solidify, (c) metal coating each anode and cathode terminal site to form a layer of metal or metals on the respective terminal sites.

54. A method of manufacturing solid state capacitors as in claim 43, wherein said a platform is generally centrally located on said anode-body-top-surface such that said anode-body-top-surfaces comprises at least on platform-region between at least two lower-regions.

55. A method of manufacturing solid state capacitors as in claim 54, further comprising the step of forming at least one conducting bridge extending from an unencapsulated portion of the substrate-bottom-surface to at least two encapsulated lower-regions.

56. A solid state capacitor comprising:
an electrically conducting substrate, said substrate comprising a substrate-top-surface, a substrate-bottom-surface, and a plurality of substrate-side-surfaces wherein said plurality of substrate-side-surfaces connect the substrate-top-surface to the substrate-bottom-surface;
an anode-body comprising an anode-body-top-surface, an anode-body-bottom-surface, and a plurality of anode-body-side-surfaces, wherein said plurality of anode-body-side-surfaces connect said anode-body-top-surface to said anode-body-bottom-surface and wherein said anode-body-bottom-surface is attached to said substrate-top-surface;
an electrically insulating layer covering substantially all of the unattached surfaces of the anode-body;
a conducting cathode layer covering substantially all of the electrically insulating layer;
wherein said anode-body-top-surface defines a platform and a lower-region wherein said platform is raised relative to said lower-region;
wherein said platform provides a cathode-terminal-site; and
wherein said substrate provides an anode-terminal-site.

57. A solid state capacitor as in claim 56, further comprising an encapsulation layer, said encapsulation layer covering the unattached surfaces of said anode-body and the unattached surfaces of said substrate, said encapsulation layer defining unencapsulated portions over the outer surface of at least one of (a) a portion of said substrate-bottom-surface, (b) a portion of a substrate-side-surface, and (c) a portion of said platform.

58. A capacitor as claimed in claim 57, wherein a conducting bridge extends to an encapsulated lower-surface adjacent to a platform-region that provides a cathode-terminal-site, thereby providing an anode-terminal-site on a common side of the capacitor with a cathode-terminal-site.

59. A capacitor as claimed in claim 56, wherein a conducting bridge extends between an anode-terminal-site to an encapsulated portion of said anode-body.

* * * * *